United States Patent [19]
Stevens et al.

[11] Patent Number: 5,600,899
[45] Date of Patent: Feb. 11, 1997

[54] METHOD AND APPARATUS FOR DRYING SOLID FOODSTUFFS

[75] Inventors: Martinus P. J. M. Stevens, Beers; Hubertus G. C. Peeters, Hegelsom, both of Netherlands

[73] Assignee: Bakcus Beheer B.V., Netherlands

[21] Appl. No.: 329,706

[22] Filed: Oct. 26, 1994

[30] Foreign Application Priority Data

Apr. 23, 1992 [NL] Netherlands ............................ 9200740
Apr. 22, 1993 [EP] European Pat. Off. ............ 93201172

[51] Int. Cl.⁶ ..................................................... F26B 3/00
[52] U.S. Cl. .................................. 34/487; 34/507; 34/219
[58] Field of Search .......................... 34/219, 210, 212, 34/216, 217, 487, 507

[56] References Cited

U.S. PATENT DOCUMENTS

| | | | |
|---|---|---|---|
| 3,100,106 | 8/1963 | Bielenberg et al. | 34/507 X |
| 4,197,084 | 4/1980 | Mullner et al. | 34/216 X |
| 4,270,283 | 6/1981 | Ellis | 34/212 |
| 4,337,083 | 6/1982 | Sweat | 34/212 X |
| 4,352,249 | 10/1982 | Rose | 34/212 |
| 4,982,511 | 1/1991 | Frei | 34/210 X |
| 4,987,688 | 1/1991 | Petit et al. | 34/69 |

FOREIGN PATENT DOCUMENTS

| | | |
|---|---|---|
| 458127 | 2/1945 | Belgium . |
| 0079523 | 5/1983 | European Pat. Off. . |
| 0271376 | 6/1988 | European Pat. Off. . |
| 7905532 | 1/1981 | Netherlands . |
| 336009 | 10/1930 | United Kingdom . |
| 1090063 | 11/1967 | United Kingdom . |

*Primary Examiner*—Hoang Nguyen
*Attorney, Agent, or Firm*—Webb Ziesenheim Bruening Logsdon Orkin & Hanson, P.C.

[57] ABSTRACT

A method and apparatus for drying solid foodstuffs is disclosed. The apparatus comprises a gas premeable conveyor belt, a plurality of heaters arranged under the conveyor belt. The apparatus further comprises a plurality of coolers. A cool gas is supplied to a first heater, heated and drawn through the conveyor belt by a first fan. The gas is transported back under the conveyor belt to a second heater, and then again drawn through the conveyor belt by a second fan. Thus, the gas is led through and along the conveyor belt along a corkscrew-shaped path against the direction of supply of the foodstuffs. As the gas is heated along its path, the gas temperature is lowest at the first location where the gas is drawn through the conveyor belt, which first location is nearest the discharge of the apparatus.

19 Claims, 1 Drawing Sheet

METHOD AND APPARATUS FOR DRYING SOLID FOODSTUFFS

BACKGROUND OF THE INVENTION

1. Field of Invention

The invention relates to a method and apparatus for drying solid foodstuffs, in particular vegetables which have been washed. More specifically, the invention relates to a method and apparatus for drying sliced vegetables following industrial slicing of these vegetables in a vegetable slicing plant.

2. Description of the Prior Art

The European patent publication EP-A-0271376 describes a process and apparatus for drying plums by supplying them to an oven on a conveyor belt, and by circulating hot air through the oven. The air temperature is uniform throughout the oven, and the temperature of the plums at the discharge is higher than their temperature at entering the oven.

The European patent publication EP-A-0079523 discloses a device and process for drying solid particles in a suspension, like e.g. urban sludges or non-edible waste. The drying installation disclosed in this document comprises a first upstream section in which the product is dried by circulating air which is heated in calorific heaters. The air that is discharged from this first section is led through a heat exchanger, mixed with discharged air from a second, downstream section and recirculated into the first section. In the second, downstream section, the product is dried by air that is heated by condensers of a heat pump, the evaporator of which is connected to the heat exchanger of the first section. The temperatures at which this drying installation operates are in the range of about 100° C., and therefore much higher than necessary for drying vegetables.

Nowadays, vegetables to be dried after washing are supplied to a centrifuge, and dried therein in a discontinuous process. The drawbacks of this drying mode are that the product to be dried is damaged by the rotating drum and by the forces which the products exert on each other, and that the damaged and torn apart parts are left behind in the centrifuge, which may lead to the centrifuge becoming unbalanced and less hygienic due to possible material infection.

SUMMARY OF THE INVENTION

The present invention seeks to provide an improved method of drying solid foodstuffs, in particular vegetables which have been washed. Such vegetables may include carrots, potatoes, cauliflower, lettuce and the like. The principle underlying the method can, however, also be used for other vegetables and foodstuffs in solid condition.

The present invention further has for its object to provide a method of drying solid foodstuffs in which the temperature of the foodstuffs after drying is substantially the same as before drying.

According to the present invention, the foodstuffs are supplied in a substantially flat bed, and a relatively cool drying gas is also supplied. At a first location the drying gas is urged to flow through or along the foodstuffs substantially perpendicularly to the direction of the bed, after which the gas is heated and dried. At a further location, spaced from said first location, the drying gas is urged to flow through or along the foodstuffs substantially perpendicularly to the direction of the bed. This further location lies upstream of the first location as seen in the direction of supply, and the temperature of the drying gas at the further location is higher than that at the first location. Subsequently, the gas is cooled and redirected to the first location, and the dried foodstuffs are discharged.

Preferably, the steps of heating and drying the gas and urging it to flow through or along the foodstuffs at a location further upstream is repeated at least one before the drying gas is cooled.

Preferably, also the steps of supplying the relatively cool gas, urging it to flow through or along the foodstuffs, heating and drying the gas, urging it to flow through or along the foodstuffs again and cooling the gas for renewed supply are repeated at least once before the dried foodstuffs are discharged.

The drying gas may be heated and dried before being urged to flow through or along the bed for the first time. The direction of flow through the bed may be upwards, and the gas may be transported back under the bed along the outside of the bed, thus resulting in a substantially corkscrew-shaped path of the gas flow.

Preferably, the gas used as drying gas is air. With foodstuffs that are sensitive to oxygen it is also possible, however, to use nitrogen or another inert gas for drying, also because the gas used in the drying process is recirculated after the absorbed water vapor has been removed.

The temperature of the foodstuffs during drying preferably does not exceed 40° C., and the foodstuffs in the bed are preferably first heated and then cooled down again during drying, such that their temperature at discharge is substantially the same as the temperature at which the foodstuffs are supplied.

The invention also seeks to provide an improved apparatus for drying solid foodstuffs, specifically washed vegetables. According to the invention, such apparatus comprises supply means for supplying a flat bed of solid food stuffs, and gas supply means for generating a supply of relatively cool drying gas. The apparatus also comprises flow generating means at a first location for causing the drying gas to flow through or along the foodstuffs in a direction of the bed. The apparatus further comprises means for heating and drying the gas that has flown through or along the bed. Connected in series with the heating means are further flow generating means for causing the drying gas to flow through or along the bed at a second location further upstream of the first location. The temperature of the drying gas at this further location is higher than that at the first location. Finally, the apparatus comprises means for recirculating the drying gas from the further flow generating means to the cool gas supply means, and discharge means for discharging the dried foodstuffs.

Further details of the method and apparatus of the invention will become apparent from the following description, wherein reference is made to the appended drawing, in which the sole figure diagrammatically illustrates the operation of the drying apparatus of the invention.

DESCRIPTION OF THE PREFERRED EMBODIMENT

Figure 1:
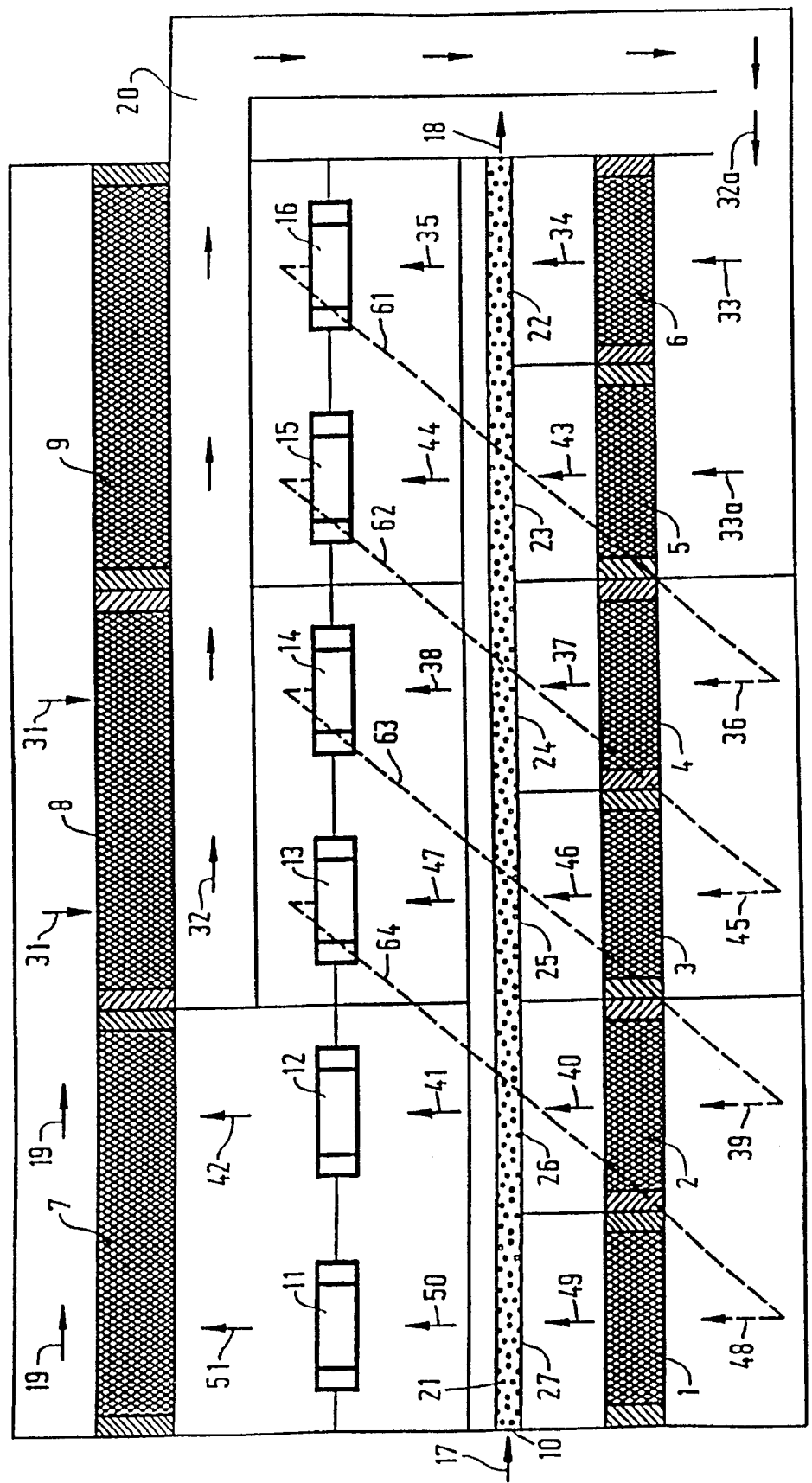
FIG. 1 is a broken isometric view of an apparatus for drying solid foodstuffs according to the present invention.

In the drawing the device is shown to comprise six successive heaters 1–6, coolers 7, 8 and 9 and gas 11–16. It will be apparent, however, that it is also possible to use a larger or a smaller number of heaters, fans and coolers, dependent on the foodstuffs or product to be dried, the nature and humidity thereof, the temperature at the supply point and the desired temperature at the discharge point and the manner in which the foodstuffs are stacked on a conveyor belt. The optimum number of heaters, coolers and fans can be adjusted by a person skilled in this field of the art, also in dependence on the capacity of the coolers, heaters and fans.

The following explanation of the system is only by way of example, therefore. The product to be dried, such as sliced carrots or lettuce, is supplied at arrow 17 by means of the perforated conveyor belt 10 or a perforated shaker conveyor 10 and, after drying, discharged at the other side, indicated by the arrow 18. Air is used as the cooling gas, said air being supplied at 19 and having a humidity of 100% and a temperature of for example 5° C. This air flow is passed through the cooler 8 at 31, whereby the air is cooled down to −5° C. A large part of the water vapor contained condenses thereby and freezes the cooler. That is why the cooler 9 is arranged beside the cooler 8, so that when the cooler 8 has built up too much resistance as a result of icing, the cooler 9 can be used and the cooler 8 can be defrosted. The air obtained at 32 has a temperature of −5° C. and a relative humidity of 100%. This cold air is supplied to the heater 6 and the heater 5 by means of the line 20. Different temperatures are set for these two heaters, so that, seen in the longitudinal direction of the conveyor belt, drying of the product to be dried takes place from the starting point 17 to the end point 18 with air having a decreasing temperature and, along the first part, a decreasing moisture content. Upon being supplied the air flow 33 has a temperature of −5° C. and a relative humidity of 100% said air being heated in the heater 6 to a temperature of 3° C. and a relative humidity of 55%. This air flow is passed through section 22 of the conveyor belt 10, whereby the quantity of foodstuffs present thereon, which has already been largely dried, is in particular cooled down to the temperature at which the product is supplied at 17. This temperature is about 2° C. The product which at 17 is supplied to the conveyor belt 10 having openings 21, is substantially dried at a temperature of 12°–15° C. in the first five sections of the conveyor belt indicated at 27–23, and cooled down again to the supply temperature, viz. about 2°–3° C., in the last part of the conveyor belt 22. Numeral 35 indicates the air leaving the conveyor belt at section 22, which air is supplied, via line 61, to the heater 4 by means of the fan 16. The product to be dried present on section 23 of the belt 10 is dried by means of air from the air flow 33a having a temperature of −5° C., said air being supplied to the heater 5 and having a temperature of 20° C. and a relative humidity of 25% upon exiting the heater 5. As a result of the low relative humidity the last remainder of moisture is removed from the product to be dried as well as possible, and the air discharged from section 23 of the conveyor belt 10 at 44 is supplied, by means of fan 15, to the heater 3 via the line 62. In the central sections 24 and 25 of the conveyor belt 10 an air flow 37 having a temperature of 25° C. and a relative humidity of 25% is obtained via the line 36 and heater 4, and after drying of the product on section 24 of the belt an air flow 38 is obtained, which at 39 is supplied to the heater 2 by means of fan 14, via line 63. In the heater 2 the air is heated to 27° C. and a relative humidity of 35%, and then passed through the product to be dried on section 26 of the belt 10, after which the air is discharged at 41, the air flow 42 being passed through cooler 7 by means of fan 12, where it is cooled down to 5° C. and a relative humidity of 100%.

The air flow at 45 is passed through the heater 3, whereby an air flow having a temperature of 25° C. and a relative humidity of 25% is obtained, which is passed along and through the product to be dried present on section 25 of the conveyor belt 10, and the cooled-down, more humid air is supplied, via lines 64 and 48, to the heater 1 by means of the fan 13, so that air having a temperature of 27° C. and a relative humidity of 35% is obtained at 49, which is passed through section 27 of conveyor belt 10, resulting in the air flow 50, which is passed through the cooler 7, by means of fan 11, as air having a temperature of 20° C. and a relative humidity of 65%, and supplied to cooler 8 again as a gas flow 19 having a temperature of 5° C. and a relative humidity of 100%, in order for the cycle to be repeated.

Initially the air flows from the fans 15 and 16 do not have the same temperature and humidity, but this air is preferably mixed prior to being passed through the heaters 3 and 4, so that the air supplied to the heaters 3 and 4 has a common temperature of 12° C. and a relative humidity of 50%.

Instead of the six fans 11–16 used in the embodiment described, it is also possible to use fewer fans, for example three, by using six fans, however, it is possible to achieve a more or less perpendicular displacement of the air flow through the product to be dried. This will prevent the occurrence of considerable accelerations in horizontal direction in the air flow, which may result in the product to be dried being blown off locally. The air velocity through or along the product to be dried should preferably be limited to about 2 m/sec., since at a higher air velocity the product is blown off or displaced in a disadvantageous manner, so that an irregular distribution over the belt of the product to be dried results. If the air supplied were to be distributed over six passages at 32a, viz. over the six heaters 1–6, the maximum air circulation per hour would be too small to remove the desired amount of moisture form the product. That is why the air flows through the fans are combined in two streams, so that the total amount of air circulating per hour is doubled. By using six independent heaters the temperature and the drying rate can readily be controlled at any point along the belt.

Every product to be dried has its own warming-up time and its own cooling-down time, dependent on the diameter of the particles to be dried. Six different temperatures can be set by the six independent heaters, depending on the requirements of the product to be dried. Each heater can be controlled separately, therefore. The fact that in the embodiment described the heating capacity is respectively controlled by two streams does not mean that it is not possible to adjust different temperatures for all six heaters.

After the usual slicing and washing freshly sliced vegetables contain 8%–30% adhering water. In order to obtain an attractive appearance and a satisfactory storage life of the packed, fresh product it is necessary to reduce the amount of adhering water by 60%–80%.

The above-described system is capable of removing about 140 kg of moisture per hour. After washing, sliced lettuce contains 30% adhering moisture. During drying the amount of adhering moisture is reduced to 6%. The time duration of the lettuce in the drier of the invention is about 15–20 minutes. The maximum layer thickness on the conveyor belt is about 12–15 cm. All this can be controlled by suitably selecting the width of the conveyor belt, whereby for the present embodiment a length of about 6 m and a width of 1,3 m have been selected.

The drawing does not show any control equipment for the temperature and humidity measurement equipment, because an expert in this field of the art will be familiar therewith.

It is possible to combine the heaters 3 and 4, as well as the heaters 1 and 2, since these heaters 1,2 and 3, 4 respectively transmit an equal amount of heat to the gas to be passed therethrough.

The advantages obtained by using this method and this apparatus lie in the fact that with this apparatus there is no loss of product, as is the case with centrifuges. The temperature of the product to be discharged can readily be controlled, which is why the product obtained from the drying plant has about the same temperature as the product to be supplied, and will normally not be higher than 40° C. during the drying process of the invention. Furthermore, the method can be carried out continuously, whilst the apparatus is easy to clean, in particular in those places where the product to be dried comes into contact with the apparatus.

We claim:

1. A method for drying solid foodstuffs, comprising the steps of:
   a) supplying the foodstuffs in a substantially flat bed,
   b) supplying a relatively cool drying gas,
   c) at a first location urging the drying gas to flow through or along the foodstuffs substantially perpendicularly to the direction of the bed,
   d) reheating and drying the gas,
   e) at a further location spaced from said first location, urging the reheated drying gas to flow through or along the foodstuffs substantially perpendicularly to the direction of the bed, the further location lying upstream of the first location as seen in the direction of supply of the foodstuffs and the temperature of the drying gas being higher at the further location than at the first location,
   f) cooling the gas to below ambient temperature and redirecting it to the first location so as to form a closed circuit, and
   g) discharging the dried foodstuffs.

2. The method as claimed in claim 1, wherein the steps d) and e) are repeated at least once at a further upstream location before the drying gas is cooled.

3. The method as claimed in claim 1, wherein the steps b) through f) are repeated at least once before the dried foodstuffs are discharged.

4. The method as claimed in claim 1, wherein the gas is heated and dried before being urged to flow through or along the bed for the first time.

5. The method as claimed in claim 1, wherein the drying gas is urged to flow through or along the bed from the bottom upward, and is transported back under the bed along the outside thereof.

6. The method as claimed in claim 5, wherein the drying gas is transported through and along the bed along a substantially corkscrew-shaped path.

7. The method as claimed in claim 1, wherein the drying as is air.

8. The method as claimed in claim 1, wherein as seen in the direction of supply the bed is first heated and dried and subsequently cooled down, such that the discharge temperature of the dried foodstuffs is substantially equal to the supply temperature thereof.

9. The method as claimed in claim 1, wherein during drying the temperature of the foodstuffs does not exceed 40° C.

10. An apparatus for drying solid foodstuffs, comprising:
    a) foodstuff supply means for supplying the foodstuffs in a substantially flat bed,
    b) gas supply and cooling means for supplying a drying gas and cooling the gas below ambient temperature,
    c) first flow generating means connected in series with said gas supply and cooling means for urging the drying gas to flow through or along the bed substantially perpendicularly to the direction thereof at a first location,
    d) reheating means connected in series with the first flow generating means for reheating and drying the gas,
    e) further flow generating means located upstream of the first flow generating means as seen in the direction of supply, connected in series with the reheating means and arranged for urging the reheated drying gas to flow through or along the bed substantially perpendicularly to the direction thereof,
    f) means for connecting the further flow generating means to the gas supply and cooling means to form a closed circuit, and
    g) discharge means connected in series with the supply means for discharging the dried foodstuffs.

11. The apparatus as claimed in claim 10, wherein additional heating means are connected in series with the further flow generating means, and additional flow generating means are connected in series with said additional heating means and located still further upstream from the first location as seen in the direction of supply, the additional flow generating means being arranged for urging the drying gas to flow through or along the bed substantially perpendicularly to the direction thereof.

12. The apparatus as claimed in claim 10, wherein preheating means for heating and drying the gas are additionally arranged between the cool gas supply and cooling means and the first flow generating means.

13. The apparatus as claimed in claim 11, wherein the supply means and discharge means comprise a gas permeable conveyor belt.

14. The apparatus as claimed in claim 13, wherein the heating means are arranged under the conveyor belt, and the flow generating means comprise fans arranged above the conveyor belt.

15. An apparatus for drying solid foodstuffs, comprising:
    a) foodstuffs supply means for supplying the foodstuffs in a substantially flat bed,
    b) gas supply means for supplying a relatively cool drying gas,
    c) first flow generating means connected in series with said gas supply means for urging the dry gas to flow through or along the bed substantially perpendicularly to the direction thereof at a first location,
    d) heating means connected in series with the first flow generating means for heating and drying the gas,
    e) further flow generating means located upstream of the first flow generating means as seen in the direction of supply, connected in series with the heating means and arranged for urging the drying gas to flow through or along the bed substantially perpendicularly to the direction thereof,
    f) means for connecting the further flow generating means to the gas supply means, and
    g) discharge means connected in series with the supply means for discharging the dried foodstuffs,
    wherein the supply means and discharge means comprise a gas permeable conveyor belt, the heating means are arranged under the conveyor belt, he flow generating means comprise fans arranged above the conveyor belt, and wherein the heating means comprise a plurality of pairs of heaters, the heaters of each said pair being connected in parallel with each other, and in series with corresponding heaters of said other pairs, and the heaters are independently controllable.

16. The method as claimed in claim 2, wherein the steps b) through f) are repeated at least once before the dried foodstuffs are discharged.

17. The method as claimed in claim 2, wherein the gas is heated and dried before being urged to flow through or along the bed for the first time.

18. The apparatus as claimed in claim 11, wherein preheating means for heating and drying the gas are additionally arranged between the cool gas supply means and the first flow generating means.

19. The apparatus as claimed in claim 11, wherein the gas supply means, flow generating means and heating means form a closed circuit.

* * * * *

UNITED STATES PATENT AND TRADEMARK OFFICE
CERTIFICATE OF CORRECTION

PATENT NO. : 5,600,899

DATED : February 11, 1997

INVENTOR(S) : Martinus P.J.M. Stevens and Hubertus G.C. Peeters

Page 1 of 2

It is certified that error appears in the above-indentified patent and that said Letters Patent is hereby corrected as shown below:

Title page, Item '[73] Assignee', "Bakcus" should read --Backus--.

Title page, Item '[30] Foreign Application Priority Data', delete priority data information.

Column 1 Line 56 after "foodstuffs insert"--with which no centrifugal forces are exerted on the foodstuffs.
     The present invention also has for its object to provide a method for drying solid foodstuffs--.

Column 2 Line 8 "one" should read --once--.

Column 2 Line 41 after "in a" insert --direction of flow that is substantially perpendicular to the--.

Column 2 Line 67 "gas" should read --fans--.

Claim 7 Column 5 Line 53 "as" should read --gas--.

UNITED STATES PATENT AND TRADEMARK OFFICE
CERTIFICATE OF CORRECTION

PATENT NO. : 5,600,899
DATED : February 11, 1997
INVENTOR(S) : Martinus P.J.M. Stevens and Hubertus G.C. Peeters It is certified that error appears in the above-indentified patent and that said Letters Patent is hereby corrected as shown below:

Claim 15 Column 6 Line 64 "he flow" should read --the flow--.

Signed and Sealed this

Third Day of June, 1997

Attest:

BRUCE LEHMAN

Attesting Officer

Commissioner of Patents and Trademarks